United States Patent

[11] 3,586,407

[72] Inventor Michael Schweitzer
Southington, Conn.
[21] Appl. No. 821,569
[22] Filed May 5, 1969
[45] Patented June 22, 1971
[73] Assignee Textron Inc.
Providence, R.I.

[54] ROLLER BEARING RETAINING MEANS
2 Claims, 3 Drawing Figs.
[52] U.S. Cl. .................................................. 308/217
[51] Int. Cl. .................................................... F16c 33/46
[50] Field of Search .................................... 308/217, 201, 218, 212

[56] References Cited
UNITED STATES PATENTS
1,250,595  12/1917  Knoth ........................ 308/217
1,870,892  8/1932  Brown ........................ 308/217
3,144,284  8/1964  Ortegren .................... 308/217

Primary Examiner—Fred C. Mattern, Jr.
Assistant Examiner—Frank Susko
Attorney—Sandoe, Hopgood & Calimafde ABSTRACT: The invention contemplates a bearing-roller retainer of machined ductile material utilizing local deformation of roller-pocket sides to develop a unit-handling assembled relation with inserted rolls. The rolls are of the recessed-end variety, and retainer material is displaced into retaining relation with the recessed ends of the rollers. The nature of the displacement is such as to achieve a retained assembly of rollers while avoiding any upset to the inherent running balance and dimensional accuracy of the machined retainer structure.

PATENTED JUN22 1971 3,586,407

INVENTOR
MICHAEL SCHWEITZER
BY
Sandoe, Hopgood & Calimafde
ATTORNEYS

ROLLER BEARING RETAINING MEANS

The present invention relates to a method and means of roller bearing retention and assembly such that individual rollers are held in unit-handling relation with a retainer for easy assembly and disassembly with respect to the inner and outer rings of a bearing.

In certain roller bearings, particularly heavy-duty bearings which must be periodically disassembled, cleaned and inspected, one of the problems is the simultaneous placing of all the rollers in the raceways and in the retainer. When such bearings are assembled manually, the task is both time-consuming and susceptible to dirt contamination.

Accordingly, it is an object of the present invention to provide an improved method of retaining rollers in an annular retainer, such that the retainer and the rollers comprise a unit-handling assembly without the necessity of handling individual rollers.

Another object is to provide an improved retainer for rollers having recessed ends.

It is a specific object to provide an improved roller-retainer construction lending itself to machined fabrication from ductile material and in which such displacement of material as is involved in locating assembled rollers produces inconsequential asymmetry in the resultant configuration, thus inducing no noticeable impairment of the rotational balance of the running bearing into which the retainer is embodied.

A further specific object is to achieve the above objects with a configuration in which the simplest tooling establishes the unit-handling relationship.

Other objects and features of the invention will be pointed out or will be apparent to those skilled in the art from the following detailed description, in connection with the accompanying drawings, illustrative of a preferred embodiment of the invention.

Figure 1:
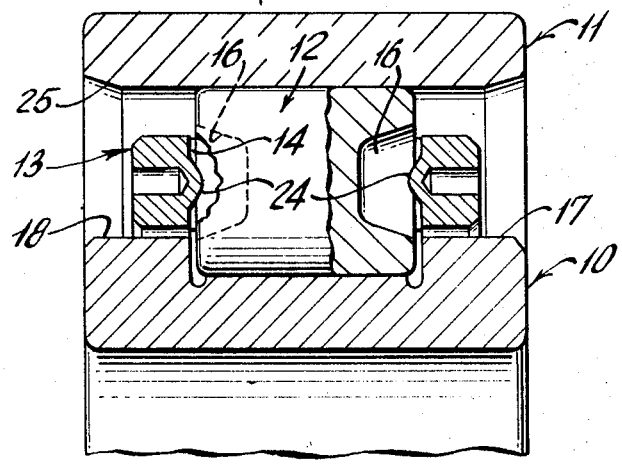
FIG. 1 is a fragmentary, partly broken-away longitudinal sectional view of a roller bearing incorporating the invention.

Briefly stated, the invention contemplates a bearing-roller retainer of machined ductile material utilizing local deformation of roller-pocket sides to develop a unit-handling assembled relation with inserted rolls. The rolls are of the recessed-end variety, and retainer material is displaced into retaining relation with the recessed ends of the rollers. The nature of the displacement is such as to achieve a retained assembly of rollers while avoiding any upset to the inherent running balance and accuracy of the machined retainer structure.

The invention may be embodied in tapered-roller bearings but is shown in application to a bearing comprising cylindrical inner and outer race rings 10—11, with interposed rollers 12 in circumferentially spaced relation. An annular retainer structure 13 has a plurality of roller pockets 14 between integral connecting arms of bridge members 15. The rollers are of the recessed-end variety, being centrally excavated as at 16, axially inwardly of the terminal plane of roller support, for avoidance of end-effect stress concentrations, all as more fully set forth in Van Dorn U.S. Pat. No. 2,947,581. The bearing shown is of the variety in which the rollers are axially located between spaced shoulders straddling one of the races, in this case, the inner. Thus, rollers 12 are located between radially outward flanges or sidewalls 17—18 of the inner ring 10.

The retainer ring may be of integral one-piece construction, being machined from suitable ductile material, such as bronze or mild steel. The overall blank configuration is annular cylindrically prismatic, and the roller pockets may be formed as suitably spaced, initially drilled, radial pilot bores of limited diameter, later expanded to desired rectangular pocket size by radial broaching techniques.

Figure 3:
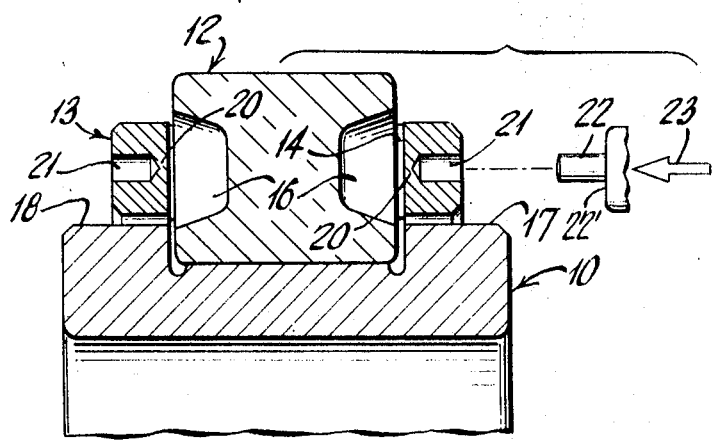
FIG. 3 is a sectional view similar to FIG. 1 to illustrate a step in the method of the invention.

In accordance with the invention, locally weakened pocket sidewall regions are provided in the retainer, near the axial center alignment for the roller of each pocket. Such a region is illustrated at 20 in FIG. 3, being defined by drilling a bore 21 axially inward on the desired alignment. Similar bores 21 are formed in the retainer-pocket sidewalls for each axial end of each pocket.

Figure 2:
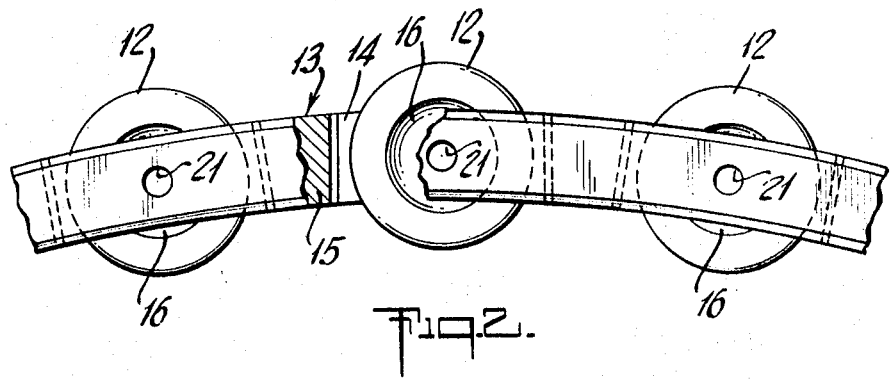
FIG. 2 is a fragmentary side view of subassembled retainer and rollers, as embodied in FIG. 1.

To assemble the rollers to the retainer, as to produce the subassembly of FIG. 2, each roller 12 is held in its pocket while weakened sidewall regions 20 are displaced axially into the included volume of the adjacent roller end recess 16. This may be performed by a special tool (not shown) having opposed projections enterable into opposed bores 21 for a given roller pocket, and squeezable to effect the desired retaining displacements 24 (FIG. 1); but in the form shown, a single punch tool 22, inserted in each bore 21, need only be pressed in or tapped with a hammer as suggested by the arrow 23; a positive stop or shoulder 22' on tool 22 indicates means to control uniformity of displacements 24. For each roller, the resulting displacements 24 at both axial ends accomplish roller retention, without imposing any running restrictions. Also, the displaced metal remains at the same radius about the bearing axis, so that no asymmetry is introduced to the detriment of balanced running of the bearing; moreover, displacements 24 are so localized as to assure against local distortion of either the land-riding surfaces of the retainer or the roller-contact surfaces of the pocket side walls.

If the bearing rollers 12 are assembled as described in connection with FIG. 2, the rollers and retainer are a unit-handling subassembly which of course must be axially assembled to both the inner and outer races; in such event, axial retention of the rollers with respect to the races will necessarily require that one of the end flanges 17—18 be removable. On the other hand, for the arrangement specifically shown in FIGS. 1 and 3, the rollers 12 should be assembled, as described, while they overstand the race channel between flanges 17—18 of the inner bearing ring. The assembly of rollers 12 to retainer 13 thus necessarily also achieves assembly into unit-handling relation with the inner ring 10. Bearing assembly is completed by axial insertion of the described subassembly into the bore which defines the race of the outer bearing ring 11. Gently flared end zones or chamfers 25, adjacent the ends of the load-bearing outer race, will be understood to facilitate such final assembly.

It will be seen that I have described an improved retainer construction and assembly method, lending itself to simple assembly techniques without comprising the running balance and accuracy of a finished bearing, even for high-speed applications. The selectively deformed localized parts relied upon for roller retention are inconspicuous and present no obstruction which might accumulate foreign matter or be subject to wear or abuse during use. The displaced material 24 is so substantially smaller than the recessed region of the adjacent roller end that no contact occurs at 24 as long as the fully assembled relationship exists. In other words, the only mechanical function served by the displacements 24 is one of roller retention during the existence of a subassembled condition.

It will be appreciated that, at the region of axial overlap between the projections 24 and the recesses 16 at the roller ends, the radial clearance of each projection (24) in its recess (16) exceeds the radial freedom of roller movement in its pocket, such radial freedom being considered for each roller with respect to the associated projection (24) axis. Such a relationship assures that when a bearing is fully assembled, roller piloting in the retainer involves the outer cylindrical surface and end faces of each roller and that such piloting is independent of any contact of a projection (24) within its recess. Additionally, for the case of the unit-handling assembly of retainer, rollers, and a flanged bearing ring, the radial freedom of the projections (24) in their recesses (16) is such with respect to the effective radial extent of flanges 17—18 that rollers are not free enough to displace out of their nested relation between the bearing-ring flanges; and in this connection, it will be understood that by selection of the effective recess (16) radius, in relation to the effective radius of the projections (24), there may be a desired control of "roller drop" in such a unit-handling assembly, thus providing simpler final assembly thereof to the remaining race member. Still further, the invention provides desired roller retention without developing the stress-raising corners, sharp-edged junctions, or other fracture-prone parts, which are characteristic of conventional staked-nib constructions.

Although the invention has been described in detail for a preferred form, it will be understood that modifications may be made within the scope of the invention as defined by the claims.

What I claim is:

1. A roller-bearing retainer comprising an annulus of ductile material with plural angularly spaced roller-receiving pockets, each pocket extending radially through said annulus and confined at axial ends by end walls forming part of said annulus, each such wall having a recess local to the central region of the wall at its adjacent pocket and open axially outwardly, each such wall recess terminating short of the axially inner limit of the wall, the depth of the recess in terms of the remaining wall thickness being such that the end wall opposite localized central region may be incrementally displaced substantially to the exclusion of the remainder of the wall for retaining a recessed roller in the pocket.

2. As an article of manufacture, a unit-handling assembly comprising a roller-bearing retainer with rollers retained therein, each of said rollers having a central recess at each end thereof, said retainer being an integral one-piece annulus with plural angularly spaced roller-receiving pockets, each pocket extending radially through said annulus and confined at axial ends by end walls forming part of said annulus, each such wall having a recess local to the central region of the wall at its adjacent pocket and open axially outwardly, the depth of the recess being such that the remaining wall thickness is small compared to the overall wall thickness, thereby defining a relatively thin end-wall portion adjacent each roller end, and a local axially inward projection integral with each said relatively thin end-wall portion, each such projection extending into loose retaining relation with the adjacent roller end recess, whereby said rollers are radially retained in unit-handling relation with said retainer solely by the action of the projections of said relatively thin end-wall portions.